United States Patent
Menen (10) Patent No.: US 10,513,285 B1
(45) Date of Patent: Dec. 24, 2019

(54) SWING, STROLLER WITH A DETACHABLE CAR SEAT

(71) Applicant: Empress M. Menen, Brooklyn, NY (US)

(72) Inventor: Empress M. Menen, Brooklyn, NY (US)

(*) Notice: Subject to any disclaimer, the term of this patent is extended or adjusted under 35 U.S.C. 154(b) by 0 days.

(21) Appl. No.: 13/920,510

(22) Filed: Jun. 18, 2013

(51) Int. Cl.
*B62B 9/22* (2006.01)
*B62B 7/14* (2006.01)

(52) U.S. Cl.
CPC ............ *B62B 7/142* (2013.01); *B62B 9/22* (2013.01)

(58) Field of Classification Search
CPC .. B62B 7/00; B62B 7/14; B62B 7/142; B62B 9/00; B62B 9/10; B62B 9/102; B62B 9/12; B62B 9/22
USPC ........... 280/642, 643, 647, 657, 658, 47.34, 280/47.38, 47.41, 30; 297/273; 472/118, 472/119
See application file for complete search history.

(56) References Cited

U.S. PATENT DOCUMENTS

| | | | |
|---|---|---|---|
| 3,806,117 A | | 5/1974 | Foster |
| 4,807,872 A | * | 2/1989 | Spilman et al. .............. 472/119 |
| 5,230,523 A | * | 7/1993 | Wilhelm .......................... 280/30 |
| 5,342,113 A | * | 8/1994 | Wu ............................... 297/260.2 |
| 5,378,196 A | * | 1/1995 | Pinch et al. ................... 472/119 |
| D377,466 S | | 1/1997 | Baesa |
| 5,947,555 A | | 9/1999 | Welsh, Jr. et al. |
| 6,250,654 B1 | * | 6/2001 | Willis ......................... 280/47.41 |
| 6,286,844 B1 | | 9/2001 | Cone, II et al. |
| 6,588,527 B2 | | 7/2003 | Lerner et al. |
| 6,916,249 B2 | * | 7/2005 | Meade ........................... 472/119 |
| 6,986,518 B1 | * | 1/2006 | Besaw ............................. 280/30 |
| 7,189,164 B1 | * | 3/2007 | Paesang et al. .............. 472/118 |
| 7,422,524 B2 | * | 9/2008 | Gregorian ...................... 472/119 |
| 8,550,556 B2 | * | 10/2013 | Asbach ........................... 297/281 |
| 2010/0320810 A1 | * | 12/2010 | Chen ............................... 297/118 |

* cited by examiner

*Primary Examiner* — John Walters
*Assistant Examiner* — Brian Swenson (57) ABSTRACT

The swing, stroller with a detachable car seat includes a baby car seat that is able to connect with a car seat dock located on a seat in a vehicle. The baby car seat is also able to connect with a baby stroller that can mobilize the baby car seat or can immobilize itself in order to provide a swinging function that swings the baby car seat back and forth with respect to the baby stroller. The baby stroller includes a "U"-shaped swinging member that attaches to and extends downward from a swing arm member provided on opposing sides of the baby stroller. The baby stroller includes telescoping feet that extend down beneath wheels provided on the baby stroller.

16 Claims, 8 Drawing Sheets

SWING, STROLLER WITH A DETACHABLE CAR SEAT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of 3-in-1 combinations of car seats, strollers, and swings. Moreover, a car seat that can connect with a stroller with the function of being able to swing back and forth as an actual swing.

Baby car seats are invaluable in transporting infants in a vehicle, but are limited to just that one use. Other modes of transport of infants involve baby strollers, which mobilize the infant where needed. Baby swinging devices are great at lulling a crying infant. What is needed is a device that can provide all of these functions. The device of the present application addresses these needs by providing a mobilized 3-in-1 swing, stroller, and detachable car seat that can dock with a car seat dock, and which can also attach to a baby stroller, and which includes a swinging function on the baby stroller in order to electively swing the baby car seat as needed.

B. Discussion of the Prior Art

As will be discussed immediately below, no prior art discloses a baby car seat and swinging stroller; wherein the baby car seat is able to connect with a car seat dock that is secured to a seat in a vehicle; wherein the baby car seat is also able to connect with a baby stroller that can mobilize the baby car seat or can immobilize itself in order to provide a swinging function that swings the baby car seat back and forth with respect to the baby stroller; wherein the baby stroller includes a "U"-shaped swinging member that attaches to and extends downward from a swing arm member provided on opposing sides of the baby stroller; wherein the baby stroller includes telescoping feet that extend down beneath wheels provided on the baby stroller; wherein the baby car seat includes a locking receptacle able to lock onto a locking member located on the swing arm member such that the baby car seat is able to lock onto the swing arm member in order to swing the baby car seat with respect to the baby stroller; wherein the locking receptacle of the baby car seat is also able to lock onto car seat dock.

The Willis Patent (U.S. Pat. No. 6,250,654) discloses a car seat/stroller assembly with swinging mechanism that combines a car seat, a stroller and a spring motor driven swinging swing into one system. However, the assembly does not also provide for a car seat that can dock with a car seat dock inside of a vehicle.

The Cone, II Patent (U.S. Pat. No. 6,286,844) discloses a stroller with a removable seat that has a swinging or swinging function. However, the stroller does not suspend the baby car seat via a swing arm member in order to swing the baby car seat or to hold the baby car seat stationary.

The Foster Patent (U.S. Pat. No. 3,806,117) discloses a spring powered baby swing with wheels. However, the swing is not a stroller, and the baby seat is unable to dock with a car seat dock.

The Welsh, Jr. et al. Patent (U.S. Pat. No. 5,947,555) discloses an apparatus and method for coupling an infant carrier to a stroller. However, the apparatus does not dock the baby car seat to a car seat dock nor swing the baby car seat with respect to a stroller.

The Lerner et al. Patent (U.S. Pat. No. 6,588,527) discloses a device for automatically swinging a stroller. However, the device does not enable a baby car seat to dock with a car seat dock.

The Baesa Patent (U.S. Pat. No. Des. 377,466) illustrates an ornamental design for a stroller/swing combination, which is unable to depict docking with a car seat dock.

While the above-described devices fulfill their respective and particular objects and requirements, they do not describe a swing, stroller with a detachable car seat; wherein the baby car seat is able to connect with a car seat dock that is secured to a seat in a vehicle; wherein the baby car seat is also able to connect with a baby stroller that can mobilize the baby car seat or can immobilize itself in order to provide a swinging function that swings the baby car seat back and forth with respect to the baby stroller; wherein the baby stroller includes a "U"-shaped swinging member that attaches to and extends downward from a swing arm member provided on opposing sides of the baby stroller; wherein the baby stroller includes telescoping feet that extend down beneath wheels provided on the baby stroller; wherein the baby car seat includes a locking receptacle able to lock onto a locking member located on the swing arm member such that the baby car seat is able to lock onto the swing arm member in order to swing the baby car seat with respect to the baby stroller; wherein the locking receptacle of the baby car seat is also able to lock onto car seat dock. In this regard, the swing, stroller with a detachable car seat departs from the conventional concepts and designs of the prior art.

SUMMARY OF THE INVENTION

The swing, stroller with a detachable car seat includes a baby car seat that is able to connect with a car seat dock located on a seat in a vehicle. The baby car seat is also able to connect with a baby stroller that can mobilize the baby car seat or can immobilize itself in order to provide a swinging function that swings the baby car seat back and forth with respect to the baby stroller. The baby stroller includes a "U"-shaped swinging member that attaches to and extends downward from a swing arm member provided on opposing sides of the baby stroller. The baby stroller includes telescoping feet that extend down beneath wheels provided on the baby stroller. The baby car seat includes a locking receptacle able to lock onto a locking member located on the swing arm member such that the baby car seat is able to lock onto the swing arm member in order to swing the baby car seat with respect to the baby stroller. The locking receptacle of the baby car seat is also able to lock onto car seat dock.

An object of the invention is to provide a baby car seat that can dock with a car seat dock and also dock with a baby stroller.

A further object of the invention is to provide a baby stroller that connects with the baby car seat, and enables the baby car seat to be strolled about.

A further object of the invention is to include a baby stroller wherein the wheels include telescoping feet that can extend beneath the wheels in order to immobilize the baby stroller while performing the swinging function.

A further object of the invention is to include a "U"-shaped swinging member that attaches to and extends downward from a swing arm member provided on opposing sides of the baby stroller.

These together with additional objects, features and advantages of the swing, stroller with a detachable car seat will be readily apparent to those of ordinary skill in the art upon reading the following detailed description of presently preferred, but nonetheless illustrative, embodiments of the swing, stroller with a detachable car seat when taken in conjunction with the accompanying drawings.

In this respect, before explaining the current embodiments of the swing, stroller with a detachable car seat in detail, it is to be understood that the swing, stroller with a detachable car seat is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the swing, stroller with a detachable car seat.

It is therefore important that the claims be regarded as including such equivalent construction insofar as they do not depart from the spirit and scope of the swing, stroller with a detachable car seat. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-7. A swing, stroller with a detachable car seat 100 (hereinafter invention) includes a baby car seat 101, and a baby stroller 201. The baby car seat 101 includes a retractable canopy 102, which enables connection to the baby stroller 201 as well as to a car seat dock 301. It shall be noted that the car seat dock 301 is secured to a vehicle seat 401.

The baby stroller 201 includes a stroller frame 202 that includes wheels 203 provided in order to mobilize the baby stroller 201. The stroller frame 202 is further defined with a stroller frame legs 204, which include the wheels 203 thereon. Moreover, the stroller frame legs 204 are hollow and include telescoping legs 205 that are able to extend and retract from the stroller frame legs 204 in order to immobilize or mobilize the wheels 203.

The baby stroller 201 includes a "U" shaped swinging member 210 that attaches to and extends down from a swing arm member 220. The "U" shaped swinging member 210 includes hook members 211 at distal ends, and which attach hook onto a swing arm motor armature 230. The swing arm motor armature 230 is an extension from a swing arm motor 231 housed within a swing arm housing 232 provided on both sides of the baby stroller 201. The swing arm motor armature 230 includes a swing arm bracket 235 provided on a distal end, which extends downwardly and engages against the "U" shaped swinging member 210 in order to securely lock the swing arm motor armature 230 movement with the "U" shaped swinging member 210 (refer to FIGS. 5A-B).

The swing arm motors 231 work in concert to collectively swing or rotate the "U" shaped swinging member 210 back and forth with respect to the baby stroller 201. Moreover, the swing arm motors 231 are electrical, and electrically powered via at least one battery 238 located elsewhere with respect to the baby stroller 201. Moreover, an on/off switch 239 is provided in-line between the battery(s) 238 and the swing arm motors 231.

Figure 1:
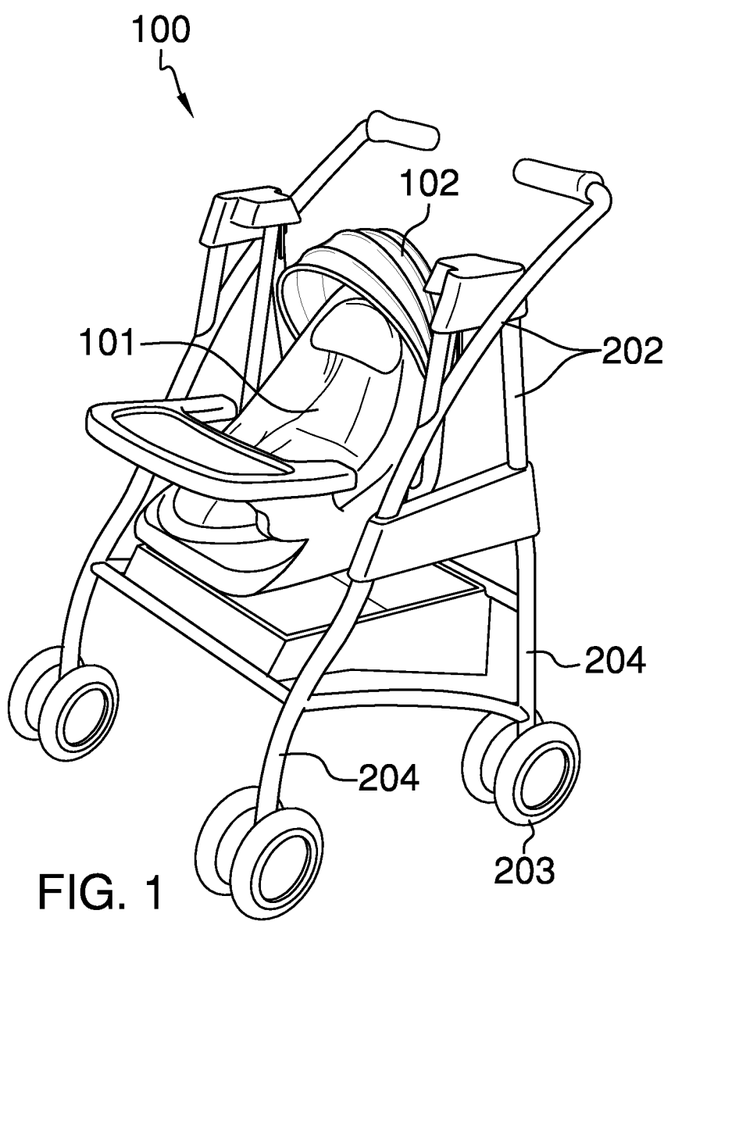
FIG. 1 illustrates a perspective view of the car seat and swinging stroller.
Figure 2:
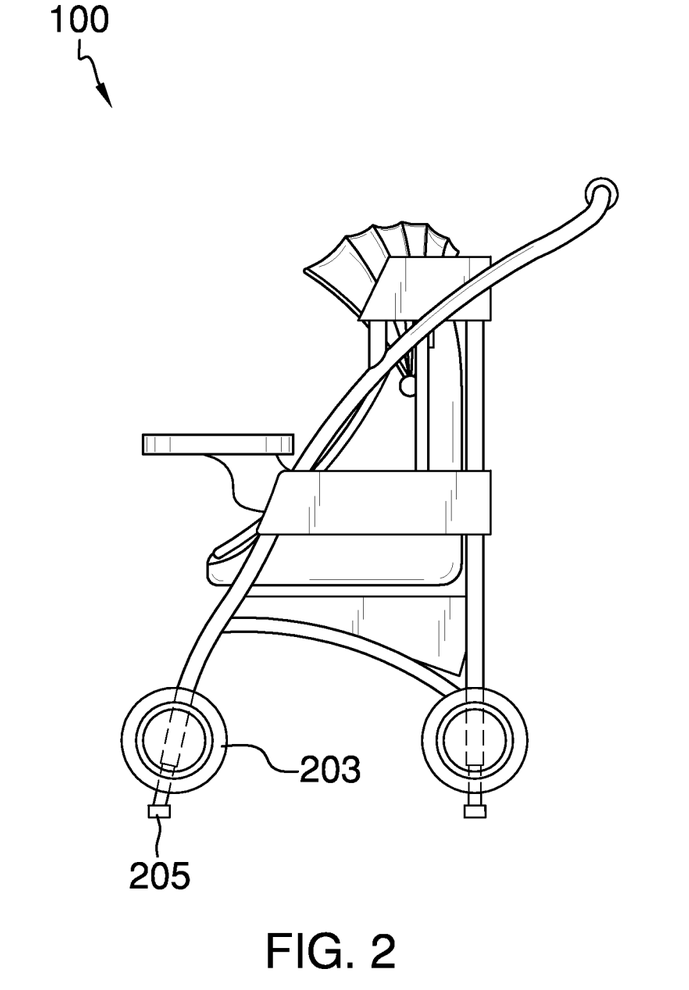
FIG. 2 illustrates a side view of the baby stroller with the telescoping feet extended.
Figure 3:
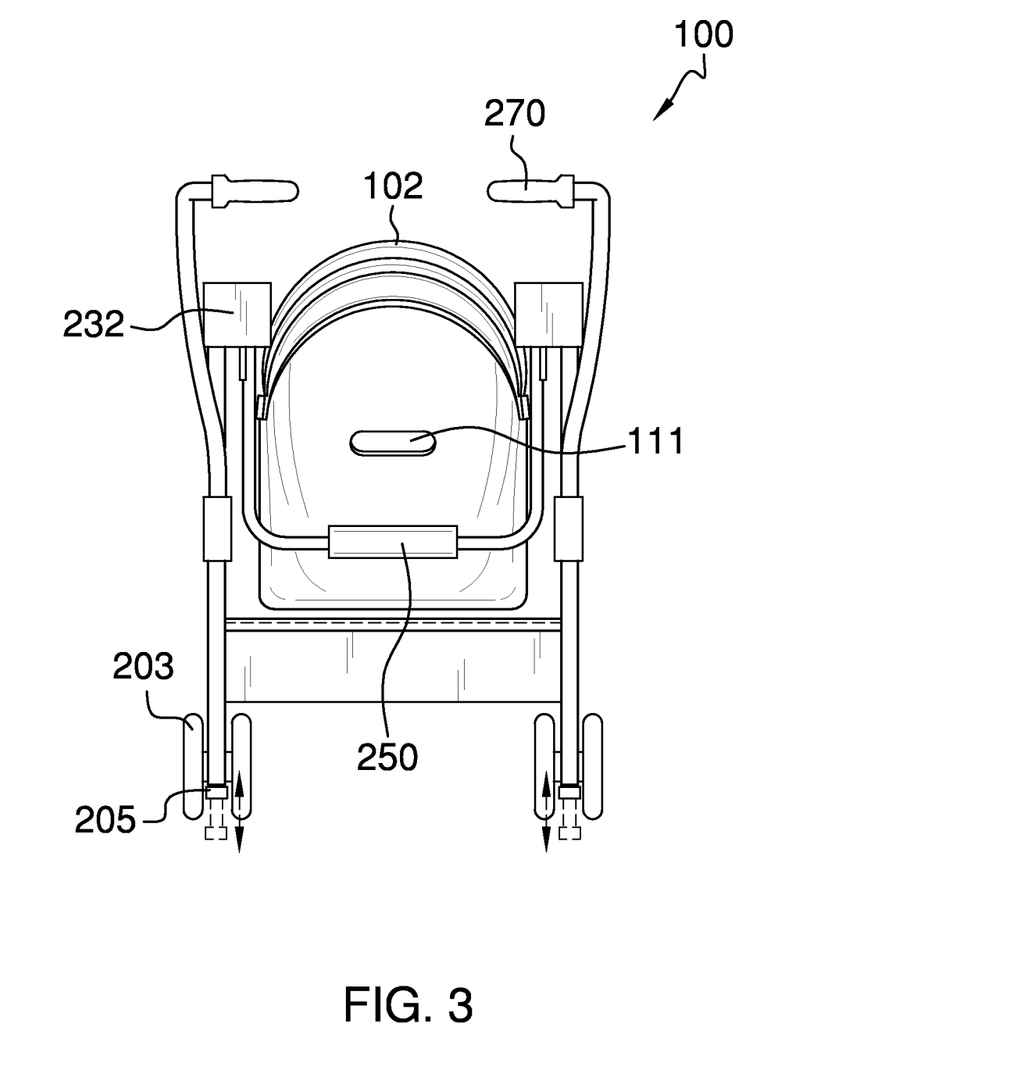
FIG. 3 illustrates a rear view of the car seat and swinging stroller.
Figure 3A:
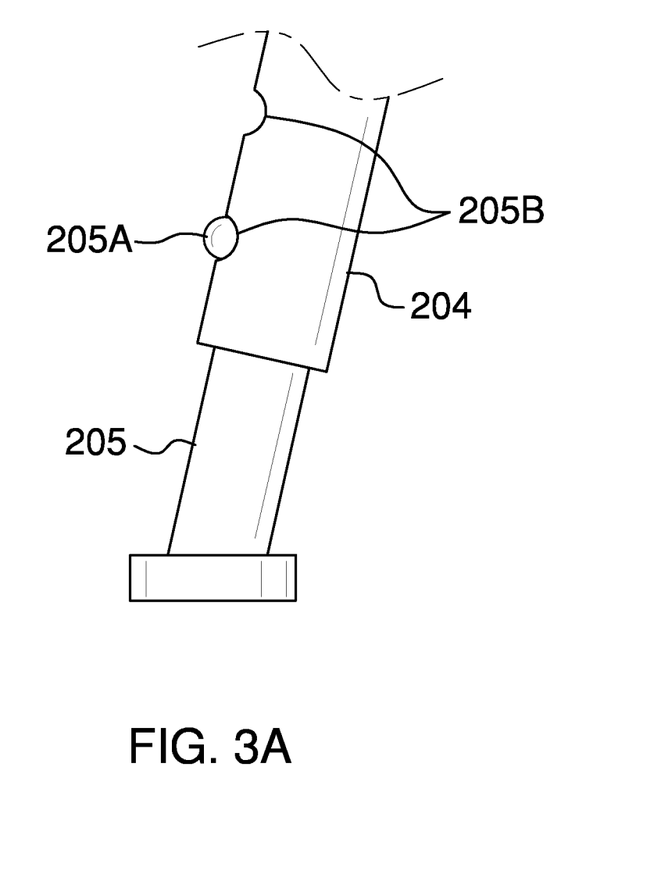
FIG. 3A illustrates a detailed view of one of the telescoping feet in relation to a respective stroller frame leg.
Figure 4:
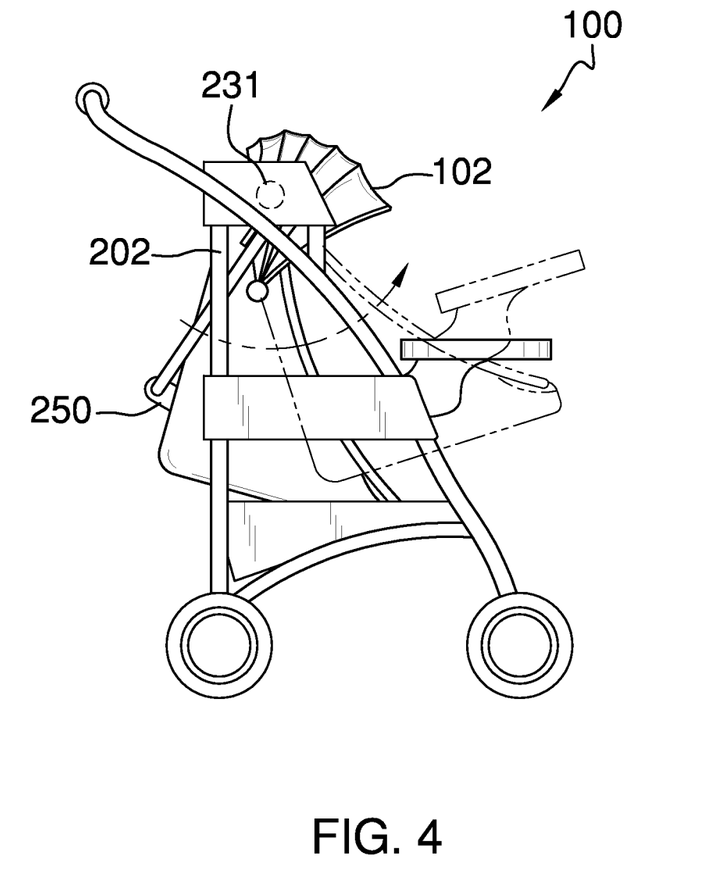
FIG. 4 illustrates another side view of the baby car seat swinging with respect to the baby stroller.
Figure 5A:
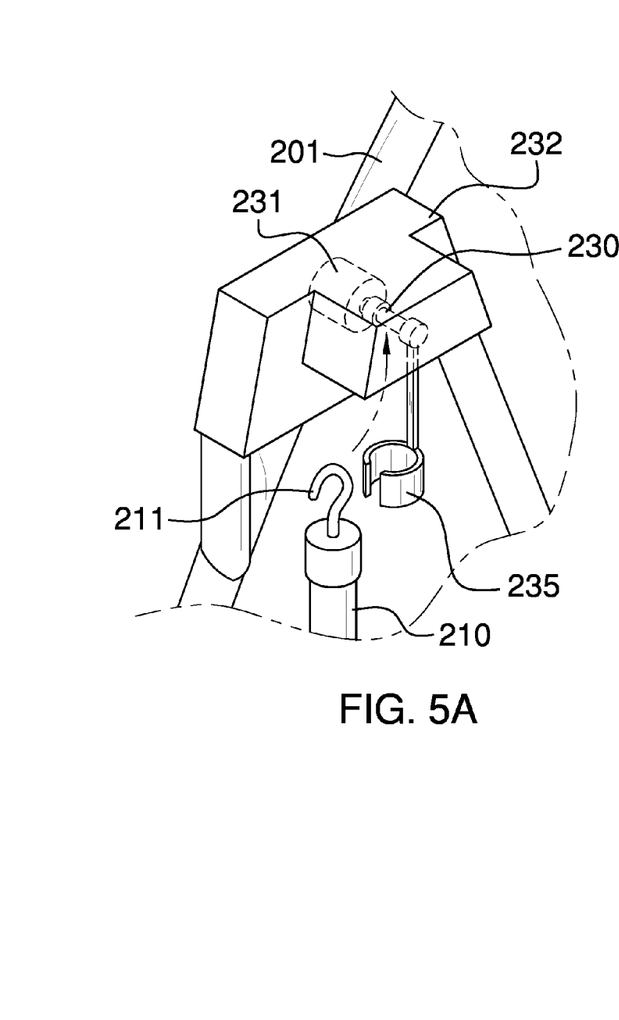
FIG. 5A illustrates a detail view of the hook of the swinging member detached from the swing arm.
Figure 5B:
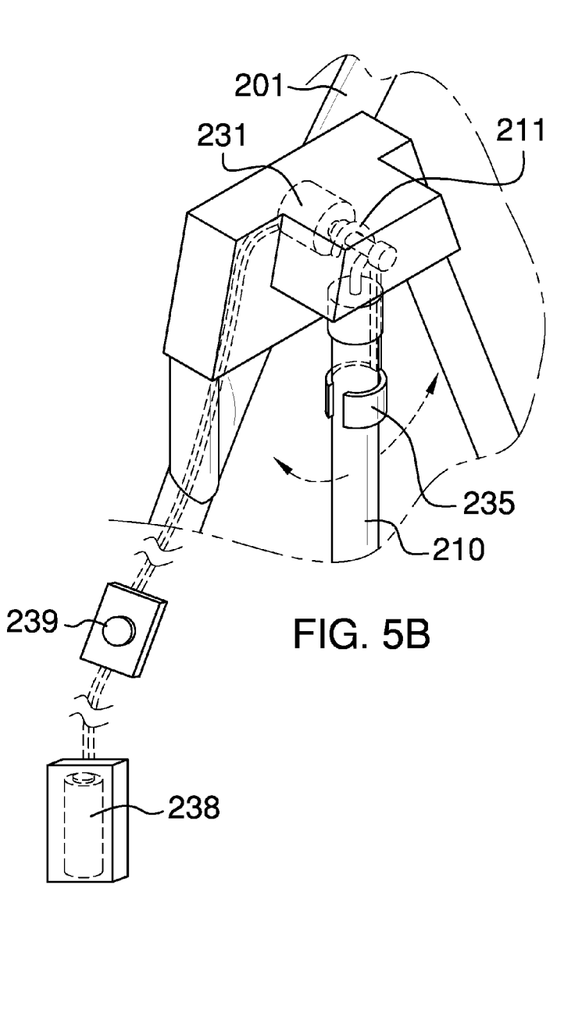
FIG. 5B illustrates another detail view of the hook of the swinging member attached to the swing arm.
Figure 6:
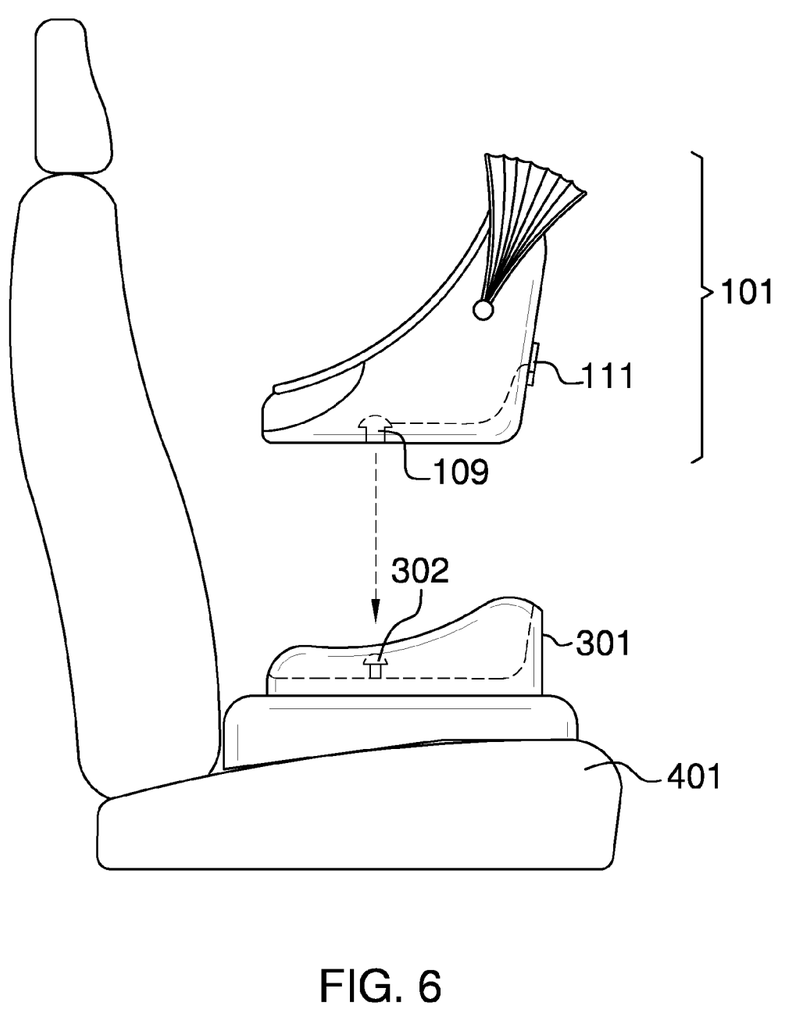
FIG. 6 illustrates a side view of the baby car seat being aligned for attachment with a car seat dock.
Figure 7:
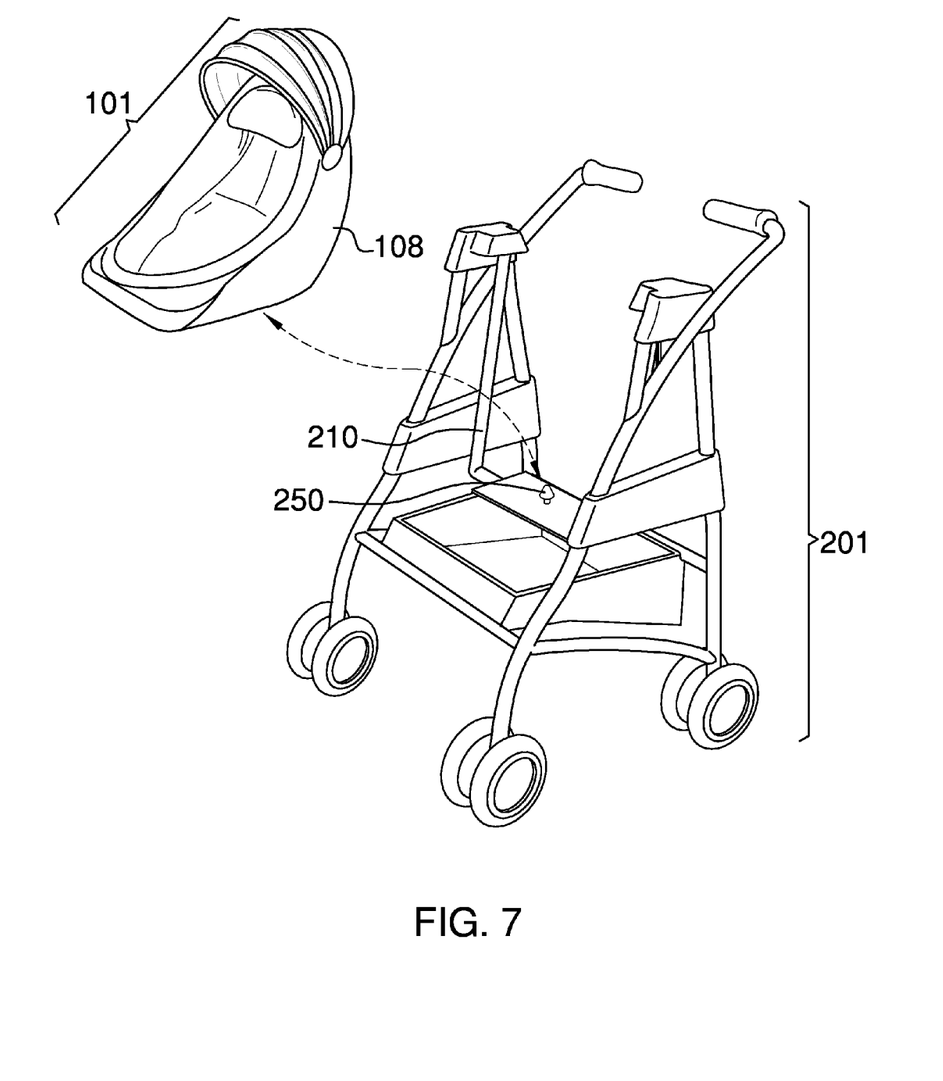
FIG. 7 illustrates another perspective view of the baby car seat with respect to the baby stroller.

The "U" shaped swinging member 210 includes a swinging locking member 250 that is centrally positioned and provided to securely connect the baby car seat 101 thereto. The baby car seat 101 includes a locking member 109 that is provided on a bottom surface 108 of the baby car seat 101. The locking member 109 includes a release handle 111 that when pulled shall unlock the baby car seat 101 with respect to the swinging locking member 250 of the baby stroller 201. It shall be noted that the release handle 111 and the locking member 109 are also being used to unlock the baby car seat 101 with respect to the car seat dock 301. Referring to FIG. 6, the car seat dock 301, like the baby stroller 201, includes a dock locking member 302.

The baby stroller 201 includes handles 270 to manually propel the baby stroller 201 when in use as a baby stroller. It shall be noted that baby stroller 201 shall be immobilized via the telescoping feet 205. The telescoping feet 205 operate to lock at two different positions, an extended position and a retracted position (see FIGS. 1 and 2). Moreover, the telescoping feet 205 employ a spring-loaded button 205A that engages holes 205B provided on the stroller frame legs 204 (see FIG. 3A).

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is not to be limited only by the scope of the following claims and their equivalents.

What is claimed is:

1. A car seat and swinging stroller:
    a baby car seat that attaches to a baby stroller or a car seat dock;
    wherein the car seat dock is secured to a vehicle seat;
    wherein the baby car seat attaches to the baby stroller via a "U" shaped swinging member that enables the baby stroller to electively swing the baby car seat back and forth with respect to the baby stroller;
    wherein the baby car seat includes a retractable canopy;
    wherein the baby stroller includes a stroller frame that includes wheels provided in order to mobilize the baby stroller; wherein the stroller frame is further defined with stroller frame legs, which include the wheels thereon; wherein the stroller frame legs are hollow and include telescoping legs that are able to extend and retract from the stroller frame legs in order to immobilize or mobilize the wheels;
    wherein the baby stroller includes a "U" shaped swinging member that attaches to and extends down from a swing arm member; wherein the "U" shaped swinging member includes hook members at distal ends, and which hook onto a swing arm motor armature.

2. The car seat and swinging stroller as described in claim 1 wherein the swing arm motor armature is an extension from a swing arm motor housed within a swing arm housing provided on both sides of the baby stroller; wherein the swing arm motor armature includes a swing arm bracket provided on a distal end, which extends downwardly and engages against the "U" shaped swinging member in order to securely lock the swing arm motor armature movement with the "U" shaped swinging member.

3. The car seat and swinging stroller as described in claim 2 wherein the swing arm motors work in concert to collectively swing or rotate the "U" shaped swinging member back and forth with respect to the baby stroller; wherein the swing arm motors are electrical, and electrically powered via at least one battery located elsewhere with respect to the baby stroller.

4. The car seat and swinging stroller as described in claim 3 wherein an on/off switch is provided in-line between the battery and the swing arm motors.

5. The car seat and swinging stroller as described in claim 4 wherein the "U" shaped swinging member includes a swinging locking member that is centrally positioned and provided to securely connect the baby car seat thereto.

6. The car seat and swinging stroller as described in claim 5 wherein the baby car seat includes a locking member that is provided on a bottom surface of the baby car seat; wherein the locking member includes a release handle that when pulled unlocks the baby car seat with respect to the swinging locking member of the baby stroller.

7. The car seat and swinging stroller as described in claim 6 wherein the release handle and the locking member are also being used to unlock the baby car seat with respect to the car seat dock; wherein the car seat dock, like the baby stroller, includes a dock locking member.

8. The car seat and swinging stroller as described in claim 7 wherein the telescoping feet operate to lock at two different positions, an extended position and a retracted position; wherein the telescoping feet employ a spring-loaded button that engages holes provided on the stroller frame legs.

9. A car seat and swinging stroller:
    a baby car seat that attaches to a baby stroller or a car seat dock;
    wherein the car seat dock is secured to a vehicle seat;
    wherein the baby car seat attaches to the baby stroller via a "U" shaped swinging member that enables the baby stroller to electively swing the baby car seat back and forth with respect to the baby stroller;
    wherein the baby car seat includes a retractable canopy;
    wherein the baby stroller includes a stroller frame that includes wheels provided in order to mobilize the baby stroller; wherein the stroller frame is further defined with stroller frame legs, which include the wheels thereon; wherein the stroller frame legs are hollow and include telescoping legs that are able to extend and retract from the stroller frame legs in order to immobilize or mobilize the wheels;
    wherein the baby stroller includes a "U" shaped swinging member that attaches to and extends down from a swing arm member; wherein the "U" shaped swinging member includes hook members at distal ends, and which hook onto a swing arm motor armature.

10. The car seat and swinging stroller as described in claim 9 wherein the swing arm motor armature is an extension from a swing arm motor housed within a swing arm housing provided on both sides of the baby stroller; wherein the swing arm motor armature includes a swing arm bracket provided on a distal end, which extends downwardly and engages against the "U" shaped swinging member in order to securely lock the swing arm motor armature movement with the "U" shaped swinging member.

11. The car seat and swinging stroller as described in claim 10 wherein the swing arm motors work in concert to collectively swing or rotate the "U" shaped swinging member back and forth with respect to the baby stroller; wherein the swing arm motors are electrical, and electrically powered via at least one battery located elsewhere with respect to the baby stroller.

12. The car seat and swinging stroller as described in claim 11 wherein an on/off switch is provided in-line between the battery and the swing arm motors.

13. The car seat and swinging stroller as described in claim 12 wherein the "U" shaped swinging member includes a swinging locking member that is centrally positioned and provided to securely connect the baby car seat thereto.

14. The car seat and swinging stroller as described in claim 13 wherein the baby car seat includes a locking member that is provided on a bottom surface of the baby car seat; wherein the locking member includes a release handle that when pulled unlocks the baby car seat with respect to the swinging locking member of the baby stroller.

15. The car seat and swinging stroller as described in claim 14 wherein the release handle and the locking member are also being used to unlock the baby car seat with respect to the car seat dock; wherein the car seat dock, like the baby stroller, includes a dock locking member.

16. The car seat and swinging stroller as described in claim 15 wherein the telescoping feet operate to lock at two different positions, an extended position and a retracted position; wherein the telescoping feet employ a spring-loaded button that engages holes provided on the stroller frame legs.

* * * * *